S. B. BLISS.
Devices for Making Soap-Bubbles.
No. 5,895. Reissued June 2, 1874.
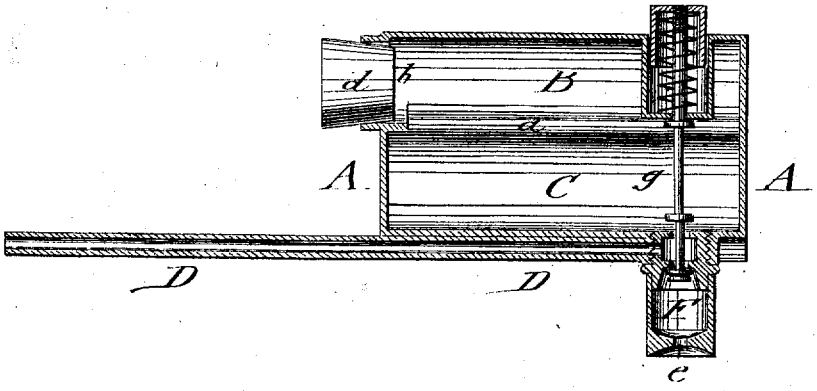
WITNESSES:
Chas. Nida
A. Seligmann
INVENTOR:
S. B. Bliss
BY
ATTORNEYS.
A.M. PHOTO-LITHOGRAPHIC CO. N.Y. (OSBORNE'S PROCESS.)

UNITED STATES PATENT OFFICE.

SAMUEL B. BLISS, OF NEW YORK, N. Y.

IMPROVEMENT IN DEVICES FOR MAKING SOAP-BUBBLES.

Specification forming part of Letters Patent No. 143,432, dated October 7, 1873; reissue No. 5,895, dated June 2, 1874; application filed May 16, 1874.

*To all whom it may concern:*

Be it known that I, SAMUEL B. BLISS, of the city, county, and State of New York, have invented a new and useful Improvement in Toy Devices for Making Soap-Bubbles, of which the following is a specification:

The accompanying drawing represents a vertical longitudinal section of my improved toy for producing soap-bubbles.

The object of my invention is to furnish for the amusement of children a toy instrument, by which soap-bubbles may be easily and quickly produced without the spilling of soap-water, and other inconveniences. My invention consists mainly in the arrangement of a casing or receptacle for soap and soap-water with an air-pipe and exit-tube, in which latter the quantity required is regulated by a suitably-constructed valve arrangement.

In the drawing, A represents a hollow casing or receptacle, preferably divided into two sections, B and C, connected by a slot, *a*, for the soap and soap-water, which are placed therein by means of an opening, *b*, which is then closed by a cork or suitable stopper, *d*. A long air-pipe, D, is applied at one side of the casing A, opening into the exit-tube F, which is provided with a concave face, having a small hole, *e*, for the formation of the bubbles, being also connected to the casing A by a suitably-constructed valve arrangement.

One or more drops of soap-water are fed by the valve into the exit-tube F after the instrument has been turned, and thoroughly shaken, with the air-pipe and exit-tube in upward position, until the contact of the water with the soap has produced soap-water of the consistency required for forming the bubbles. The instrument is then turned back, the soap-water being ready for use, and the soap thereby economized, as it does not come in contact with the water when blowing the bubbles.

A valve-rod, *g*, passes through a suitable aperture of the exit-tube, and operates the valve-connection of the casing and exit-tube for admitting one or more drops into the latter from the soap-water receptacle, so that, by blowing gently through the air-pipe D, the soap-bubble is produced. Each pressure of the valve permits the blowing of a bubble, as a small quantity is supplied at each motion of the valve-rod, producing the bubbles with great rapidity and continuity till the soap-water is exhausted, to be replenished in the manner described.

Having thus described my invention, I claim as new and desire to secure by Letters Patent—

1. The instrument or toy device for producing soap-bubbles, consisting of a hollow casing or receptacle for the soap and soap-water, an air-pipe, an exit-tube, and a soap-water-feeding valve, arranged substantially as and for the purpose described.

2. The exit-tube having concave face, with perforation for the issuing of the soap-bubbles, as specified.

SAMUEL B. BLISS.

Witnesses:
PAUL GOEPEL,
T. B. MOSHER.